July 6, 1937. C. A. CLARKE ET AL 2,085,956
BEVERAGE PRESERVING AND DISPENSING DEVICE
Filed Sept. 18, 1933
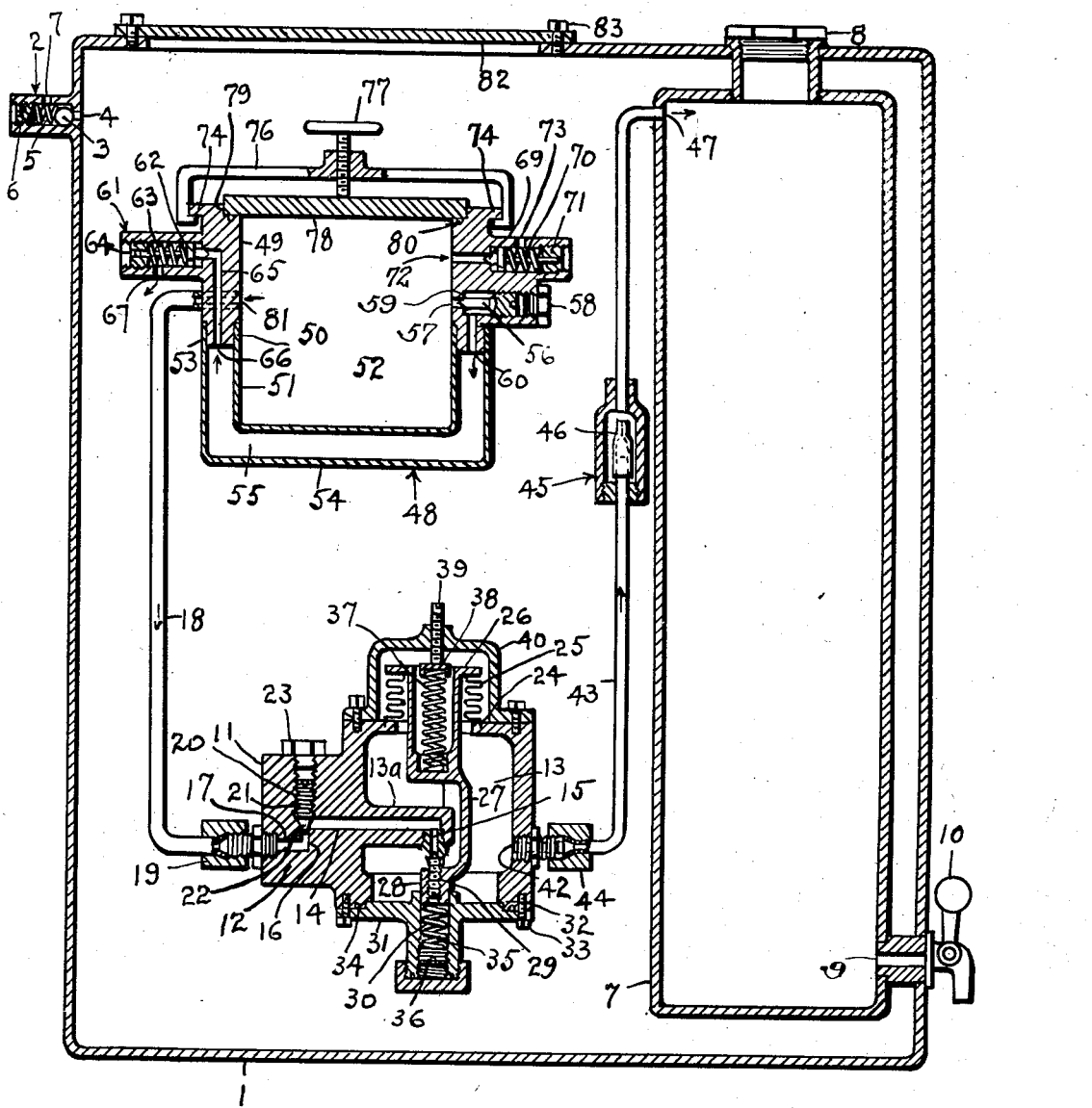
INVENTORS.
C. Albert Clarke
Victor Wright Patented July 6, 1937

2,085,956

UNITED STATES PATENT OFFICE 2,085,956

BEVERAGE PRESERVING AND DISPENSING DEVICE

Charles A. Clarke, New York, and Victor Wright, Queens Village, N. Y., assignors, by mesne assignments to Carbonaire Beverage Dispenser Inc., New York, N. Y., a corporation of New York Application September 18, 1933, Serial No. 689,830

18 Claims. (Cl. 225—18)

Our invention relates to the preservation and dispensing of beverages and refers more particularly to a device for utilizing the gas sublimated from carbon dioxide ice for preserving and dispensing the beverages.

One object of our invention is to provide a compact unit for automatically dispensing relatively small quantities of beer or the like.

Another object of our invention is to provide a sealable carbon dioxide ice container having an inner chamber holding carbon dioxide ice connected by a needle valve to an outer chamber, adjustable bleeders for both chambers and means connecting the inner chamber with the inlet of a pressure reducing valve whose outlet is connected by a pipe containing a check valve to a beer container.

A further object of our invention consists of an outer container having a bleeder valve therein, with another inner beverage container therein having an inlet and outlet passing through the outer container, a carbon dioxide ice container connected to a pressure reducing valve with its inlet attached to the carbon dioxide ice container and its outlet to said beverage container and means controlling the pressure and sublimation of the carbon dioxide ice.

Accordingly our invention is embodied in a device arranged and constructed as hereinafter described and as illustrated in the accompanying drawing which is a vertical sectional view of the device.

The device is preferably embodied in a compact unit comprising an outer housing or container 1 within which there is suitably supported a carbon dioxide ice container unit 48, a pressure reducing valve unit 11 and a beverage container 7 together with their connecting pipes, other valves and parts.

The outer container 1 has a large inlet opening closed by a cover 82 held in place by bolts 83. Suitable brackets or other ordinary supporting means, not shown, may be provided for supporting the units within the container. Such supporting means are not shown because they form no part of the invention and may easily be supplied.

The carbon dioxide ice container 48 consists of an open casting 49 forming inner and outer shoulders 50 and 53 for supporting and attaching an inner and outer shell 51 and 54. The container is closed by a cover 78 held pressure tight on the container by means such as a clamp 76 engaging underneath lugs 74 or the like and screwed down by a screw 77. 80 is a gasket underneath the cover. There is thus formed within the container an inner chamber 52 and an outer chamber 55. The parts may be circular or of any other suitable shape, the outer chamber completely surrounding the bottom of the inner chamber as will be understood.

Communication is established between the two chambers by way of passages 57 and 60 controlled by an adjustable needle valve 56 operable against a seat 59. A screw cap 58 closes the needle valve chamber.

Communication is established between the outer chamber and the container 1 by way of a passage 66 leading to a bleeder valve 61 having a needle valve 62 held against a seat 65 by a spring 63 the pressure of which is adjusted by a screw 64.

In a similar manner communication is established between the inner chamber 52 and the container 1 by way of a passage 72 and bleeder outlet 73 controlled by a needle valve 69 having a spring 70 and a tension adjusting screw 71. The needle tends to close the passage 72 as shown.

The inner carbon dioxide ice chamber is connected to the pressure reducing valve 11 by a pipe 18. The reducing valve unit comprises a body 12 forming a valve chamber 13. Projecting into the chamber is a portion 13a. Passages 15, 14, 16, and 17 lead from the valve chamber 13 to the pipe 18 which is attached by a suitable coupling 19. The flow of gas from pipe 18 to valve chamber 13 is controlled at two points. First by means of an adjustable needle valve 21 the cone point 22 of which is adapted to control the opening of the passage 16 and this valve element also includes a closing cap 23. The second point is at the inner end of the vertical passage 15 the outlet of which is controlled by an adjustable needle valve 29 mounted in a boss 28. The cone point 22 of the needle valve 21 acts to regulate the flow of gaseous carbon dioxide from the passage 16 into the passage 14 while the needle valve 29 which is in cooperative relation with the discharge end of the vertical passage 15 acts to regulate the flow of the carbon dioxide gas from the passage 15 into the valve chamber 13. This results in the reduction of the pressure of the gaseous carbon dioxide first in the passage 14 and then a still further reduction in the pressure of the gaseous carbon dioxide in the valve chamber 13. The boss is part of a floating yoke 27 mounted within the reducing valve chambers 13. The boss 28 is adapted to slide within the opening 30 provided in the valve cover 31. The cover is held against a shoulder 32 by screws 33. 34 is a gasket. The needle valve 29 is held against the outlet of passage 15 by a spring 35 the tension of which is adjusted by a screw 36, the opening 30 being closed by a cap.

The upper end of the yoke 27 forms a flange 26. 24 is a groove in the valve body and between this groove and said flange there is secured a bellows diaphragm 25.

The valve chamber 13 is closed at the top by a dome shaped cap 40 which supports an adjusting screw 39 the inner end of which carries a cap 38 which bears against a spring 37. The latter in turn bears against the yoke 27.

Thus it will be seen that pressure within the reducing valve operates to extend the bellows diaphragm 25 to lift the yoke 27 and thereby close the needle valve 29. This operation, in turn, is counterbalanced and controlled by the two adjustable opposed springs 30 and 37 so that a predetermined uniform low pressure may be obtained within the valve chamber 13. In addition, of course, the initial flow of gas into the valve may be regulated by the first mentioned needle valve 22.

The gas passes out of the valve chamber at the outlet 42 and into the pipe 43 which is attached by a coupling 44. The pipe 43 leads to the top of the beverage container 7. In this pipe there is inserted a check valve 46 of the back pressure flexible check type. The check 46 within the valve is preferably of rubber and so arranged that gas will pass through the valve into the container 7 if the pressure in the latter is less than in the reducing valve chamber 13 and pipe 43. If the pressure is greater within the container 7 the check valve will close and no gas will pass through it.

The container 7 may have an inlet 8 reachable from the outside and an outlet 9 at the bottom with a faucet 10. The outside container 1 has a check valve 2 comprising a ball 3 for closing an outlet 4 and seated by a spring 5. A screw 6 is for adjusting the tension of the spring and 7 is a bleeder outlet in the valve.

The operation is as follows:

A piece of carbon dioxide ice, which is sold commercially under the name dry ice, is placed in the inner ice chamber 52 which is thereafter closed pressure tight and by sublimation gas is formed in the usual manner within the chamber. By properly adjusting the bleeder valve 68 the pressure within the inner chamber may be controlled to the desired degree. By adjusting the needle valve 56 between the two chambers the flow of gas from the inner chamber 52 to the outer chamber 55 may be regulated so that, together with regulation of the outer bleeder valve 61, a predetermined lower pressure is caused to be maintained in the outer chamber. It will therefore be seen that the outer ice chamber functions as an insulating element around the inner chamber to retard the sublimation of the carbon dioxide ice therein for purposes of efficiency and economy.

In other words, the rate of flow of gas and the pressure thereof when it passes into the pipe 18 may be completely controlled by the instrumentalities described in connection with the operation of the carbon dioxide ice units.

The gas then flows down through the pipe 18 and into the pressure reducing valve unit 11 in which the flow of gas and the pressure thereof is controlled by the two valves 21 and 29 until we obtain a completely controlled reduced uniform gas pressure within the valve chamber 13 and within the pipe 43. That is to say, the pressure of the $CO_2$ gas resulting from the sublimation of the carbon dioxide ice is stepped down by means of the several described valve elements until the desired predetermined operating pressure is obtained such as is necessary for the practical successful dispensing of the beverage, more particularly beer within the container 7. If by any change there should be a greater pressure within the container than within the feeder pipe 43 the check valve will automatically close and remain closed until the balance has been restored. Without the check valve it is clear that a greater pressure in the container 7 would of course back up and close the needle valve 29 due to the greater areas within the reducing valve upon which such back pressure would act.

The gas which may bleed out from the two ice chambers by way of their respective bleeder valves as set forth will act as a refrigerant within the outer container 1. A pressure will therefore be established within the container, but this in turn is regulated by the setting of the bleeder valve 2.

We claim:—

1. In combination, a container, an adjustable bleeder valve in said container, a liquid receptacle within the said container, an outlet for said receptacle, an inlet for said receptacle, an adjustable pressure reducing valve within the container, a check valve between the liquid receptacle and the pressure reducing valve, a carbon dioxide ice receptacle having an inner and an outer chamber within said container, relief valves for the inner and outer chambers, and means operably connecting the carbon dioxide ice receptacle and the pressure reducing valve to the liquid receptacle within the container.

2. In combination, a container, an adjustable bleeder valve, in said container, a liquid receptacle within the said container, an outlet for said receptacle, an inlet for said receptacle, an adjustable pressure reducing valve within the container, a check valve between the liquid receptacle and the pressure reducing valve, a carbon dioxide ice receptacle having an inner and outer chamber, an adjustable valve between the inner and outer chamber, within the container, adjustable relief valves for the inner and outer chambers, and means operably connecting the carbon dioxide ice receptacle and the pressure reducing valve to the liquid receptacle within the container.

3. In combination, a container, an adjustable bleeder valve in said container, a liquid receptacle within the said container, an outlet for the said receptacle, an inlet for the said receptacle, an adjustable pressure reducing valve within the container, a detachable sealing cover for the carbon dioxide ice container, a check valve between the liquid receptacle and the pressure reducing valve, a carbon dioxide ice receptacle having an inner and an outer chamber, an adjustable valve between the inner and the outer chamber, within the container, adjustable bleeder valves for the inner and the outer chambers, a detachable cover for the container, and means operably connecting the carbon dioxide ice receptacle and the pressure reducing valve to the liquid receptacle within the container.

4. In combination, a container having an inner chamber for receiving carbon dioxide ice and an outer chamber for containing carbon dioxide gas, means for maintaining predetermined pressures of carbon dioxide gas in said chambers, a pressure reducing valve, a pipe leading to the latter from said inner chamber, a beverage receptacle and a pipe leading to the latter from the said valve.

5. In combination, a container having an inner chamber for receiving carbon dioxide ice and an outer chamber for containing carbon dioxide gas, means for maintaining predetermined pressures of carbon dioxide gas in said chambers, a pressure reducing valve, a pipe leading to the latter from said inner chamber, a beverage receptacle, a pipe leading to the latter from the said valve, an outer container enclosing all of the aforesaid elements and a communication between said outer gas chamber and the inside of said enclosing outer container.

6. In combination, a container having an inner chamber for receiving carbon dioxide ice and an outer chamber for containing carbon dioxide gas, means for maintaining a predetermined pressure of carbon dioxide gas in the inner chamber, means for maintaining a predetermined lesser pressure in the outer chamber, a pressure reducing valve, a beverage container and pipes communicating between said inner chamber, the said valve and the said beverage container.

7. In combination, a container having an inner chamber for receiving carbon dioxide ice and an outer chamber for containing carbon dioxide gas, means for maintaining a predetermined pressure of carbon dioxide gas in the inner chamber, means for maintaining a predetermined lesser pressure in the outer chamber, a pressure reducing valve, a beverage container, pipes communicating between said inner chamber, the said valve and the said beverage container, an outer container enclosing all of the aforesaid elements and a communication between said outer gas chamber and the inside of said enclosing outer container.

8. In combination, a carbon dioxide ice container, means for maintaining a predetermined pressure of carbon dioxide gas therein, a beverage container, means for conducting carbon dioxide gas from said ice container to the top of the said beverage container, mechanism in said gas conveying means for reducing the pressure of the carbon dioxide gas to a predetermined uniform low pressure before it passes into said beverage container, an outer container enclosing all of the aforesaid elements and communicating with said ice container to receive carbon dioxide gas therefrom and means for maintaining a predetermined carbon dioxide gas pressure within said outer enclosing container.

9. In combination, a carbon dioxide ice container, means for maintaining a predetermined uniform pressure of carbon dioxide gas therein, a beverage container, pipes for conducting carbon dioxide gas from said ice container to the top of the said beverage container, a pressure reducing valve in said pipes for reducing the pressure of the carbon dioxide gas to a predetermined low pressure to accord with the requirements for dispensing the contents of said beverage container, a check valve in said pipes between the pressure reducing valve and the beverage container, an outer container enclosing all of the aforesaid elements and communicating with said ice container to receive carbon dioxide gas therefrom and means for maintaining a predetermined carbon dioxide gas pressure within said outer enclosing container.

10. The method of cooling and dispensing beverages by the application thereto of carbon dioxide gas which consists in enclosing carbon dioxide ice in a container; enclosing the beverage in a container; causing the discharge of a portion of the sublimated carbon dioxide gas into the beverage container; controlling and reducing the pressure of the gas before it reaches the beverage; preventing return flow of gas from said beverage container, and also utilizing another portion of said sublimated carbon dioxide gas to cool the beverage.

11. A beverage cooling and dispensing apparatus comprising a closed refrigerant chamber for the reception of solid carbon dioxide, means acting to prevent the pressure of the gaseous carbon dioxide liberated by the evaporation of the solid carbon dioxide in said chamber from going beyond a predetermined point, a valve housing, an inlet in said housing, a pipe communicating between said chamber and said inlet, means in said inlet for regulating the flow of gaseous carbon dioxide from said pipe into said inlet, a valve mechanism in said housing for reducing the gaseous carbon dioxide admitted thereto to another predetermined pressure, a beverage container, and a pipe communicating with said housing and said container for conducting the gas from said housing to said container to thereby cool and place the beverage under the desired head of pressure for dispensing purposes.

12. A beverage cooling and dispensing apparatus comprising a closed refrigerant chamber for the reception of solid carbon dioxide, means acting to prevent the pressure of the gaseous carbon dioxide liberated by the evaporation of the solid carbon dioxide in said chamber from going beyond a predetermined point, a valve housing, an inlet in said housing, a pipe communicating between said chamber and said inlet, means in said inlet for regulating the flow of gaseous carbon dioxide from said pipe into said inlet means in operative relation with the discharge end of said inlet for controlling the flow of gas from said inlet into said housing, a valve mechanism in said housing for reducing the gaseous carbon dioxide admitted thereto to another predetermined pressure, a beverage container, and a pipe communicating with said housing and said container for conducting the gas from said housing to said container to thereby cool and place the beverage under the desired head of pressure for dispensing purposes.

13. A beverage cooling and dispensing apparatus comprising a closed refrigerant chamber for the reception of solid carbon dioxide, means acting to prevent the pressure of the gaseous carbon dioxide liberated by the evaporation of the solid carbon dioxide in said chamber from going beyond a predetermined point, a valve housing, an inlet in said housing, a pipe communicating between said chamber and said inlet, means in said inlet for regulating the flow of gaseous carbon dioxide from said pipe into said inlet, a valve mechanism in said housing for reducing the gaseous carbon dioxide admitted thereto to another predetermined pressure, a beverage container, a pipe communicating with said housing and said container for conducting the gas from said housing to said container to thereby cool and place the beverage under the desired head of pressure for dispensing purposes, and means in said second-named pipe for permitting the flow of gas therethrough in only one direction.

14. A beverage cooling and dispensing apparatus comprising a closed refrigerant chamber for the reception of solid carbon dioxide, means acting to prevent the pressure of the gaseous carbon dioxide liberated by the evaporation of the solid carbon dioxide in said chamber from going beyond a predetermined point, a valve housing, an inlet in said housing, a pipe communicating between said chamber and said inlet, means in said inlet for regulating the flow of gaseous carbon dioxide from said pipe into said inlet, means in operative relation with the discharge end of said inlet for controlling the flow of gas from said inlet into said housing, a valve mechanism in said housing for reducing the gaseous carbon dioxide admitted thereto to another predetermined pressure, a beverage container, a pipe communicating with said housing and said container for conducting the gas from said housing to said container to thereby cool and place the beverage under the desired head of pressure for dispensing purposes, and means in said second-named pipe for permitting the flow of gas therethrough in only one direction.

15. The method of cooling and dispensing beverages by the application thereto of carbon dioxide gas which consists in enclosing carbon dioxide ice in a container, enclosing the beverage to be dispensed in a receptacle, causing the discharge of a portion of the sublimated carbon dioxide gas into the beverage receptacle to place the beverage under a head pressure sufficient for dispensing, reducing the pressure of said portion of sublimated carbon dioxide gas before it reaches the beverage receptacle, controlling said reduction by the pressure of the gas in the beverage receptacle, and causing the discharge of another portion of the sublimated carbon dioxide gas to cool the beverage.

16. The method of cooling and dispensing beverages by the application thereto of carbon dioxide gas which consists in enclosing carbon dioxide ice in a container, enclosing the beverage to be dispensed in a receptacle, causing the discharge of a portion of the sublimated carbon dioxide gas into the beverage receptacle to place the beverage under a head pressure sufficient for dispensing, reducing by expansion the pressure of said portion of sublimated carbon dioxide gas before it reaches the beverage receptacle, controlling said reduction by the pressure of the gas in the beverage receptacle, and causing the discharge of another portion of the sublimated carbon dioxide gas directly from said container to cool the beverage.

17. The method of cooling and dispensing beverages by the application thereto of carbon dioxide gas which consists in enclosing carbon dioxide ice in a container for sublimation purposes, enclosing the beverage to be dispensed in a receptacle, causing a portion of sublimated carbon dioxide gas at one given pressure to be discharged into the beverage receptacle to place the beverage under a head pressure sufficient for dispensing, and causing the discharge of another portion of the sublimated carbon dioxide gas at another separate and independent given pressure to cool the beverage.

18. The method of cooling and dispensing beverages by the application thereto of carbon dioxide gas which consists in enclosing carbon dioxide ice in a container for sublimation purposes, enclosing the beverage to be dispensed in a receptacle, causing a portion of sublimated carbon dioxide gas at one given pressure to be discharged into the beverage receptacle to place the beverage under a head pressure sufficient for dispensing, and causing the discharge of another portion of the sublimated carbon dioxide gas at a separate and independent pressure higher than the first mentioned pressure to cool the beverage.

CHARLES A. CLARKE.
VICTOR WRIGHT.